(12) United States Patent
Porter et al.

(10) Patent No.: US 7,222,588 B2
(45) Date of Patent: *May 29, 2007

(54) PET GROOMING TOOL AND METHOD FOR REMOVING LOOSE HAIR FROM A FURRY PET

(75) Inventors: Angela L. Porter, Fenton, MO (US); David R. Porter, Fenton, MO (US)

(73) Assignee: FURminator, Inc., Fenton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,889

(22) Filed: Oct. 28, 2005

(65) Prior Publication Data

US 2006/0037556 A1 Feb. 23, 2006

Related U.S. Application Data

(63) Continuation of application No. 10/892,781, filed on Jul. 16, 2004, which is a continuation of application No. 09/584,053, filed on May 30, 2000, now Pat. No. 6,782,846.

(51) Int. Cl.
*A01K 13/00* (2006.01)

(52) U.S. Cl. ............... 119/625; 119/611; 119/618

(58) Field of Classification Search ............ 119/625, 119/628, 613, 611, 608, 609, 618, 614, 616, 119/617, 623, 626, 630, 631, 632, 633; 30/34.2, 30/526, 195, 346.56, 355; 132/213.1, 213, 132/214, 215
See application file for complete search history.

(56) References Cited

U.S. PATENT DOCUMENTS

| 154,784 A | 9/1874 | Lazar |
| 191,608 A | 6/1877 | Miller |
| 208,345 A | 9/1878 | Battaglia |

(Continued)

FOREIGN PATENT DOCUMENTS

DE  3844276  12/1988

(Continued)

OTHER PUBLICATIONS

The Following Documents Were all Produced During the Following Litigation Matter: *Furminator, Inc.*, vs. *Ontel Products Corp.* et al in the United States District Court, Eastern District of Missouri, Eastern Division.

(Continued)

*Primary Examiner*—Yvonne R. Abbott
(74) *Attorney, Agent, or Firm*—Thompson Coburn LLP

(57) ABSTRACT

A pet grooming tool, for use with a furry pet such as a dog or cat having loose hair and non-loose hair, is adapted for removing the loose hair from the pet. The grooming tool comprises an elongate handle portion extending generally along a handle axis, and a pet engageable portion secured to the handle portion. The pet engageable portion includes a blade portion and a plurality of teeth. The blade portion includes a blade edge. The teeth extend from the blade edge. The blade edge is adapted to engage the loose hair of the pet and pull it from the pet without cutting or pulling the non-loose hair from the pet.

29 Claims, 2 Drawing Sheets

U.S. PATENT DOCUMENTS

| | | | |
|---|---|---|---|
| 220,416 A | 10/1879 | Priest | |
| 244,712 A | 7/1881 | Houston | |
| 441,136 A | 11/1890 | Clements | |
| 486,295 A | 11/1892 | Pflueger | |
| 665,172 A | 1/1901 | Carden | |
| 674,038 A * | 5/1901 | Obey | 119/617 |
| 797,184 A | 8/1905 | Deneen | |
| 1,061,014 A | 5/1913 | Sawyer | |
| 1,085,063 A | 1/1914 | Prouty et al. | |
| 1,749,543 A | 3/1930 | Oster | |
| 1,875,125 A | 8/1932 | Oster | |
| 2,068,085 A | 1/1937 | Stanley | |
| 2,151,056 A | 3/1939 | Stone | |
| D154,784 S | 8/1949 | Lazar | |
| 2,928,171 A | 3/1960 | Oster | |
| 2,961,997 A | 11/1960 | Oliver | |
| 3,308,500 A | 3/1967 | Woodruff | |
| D208,345 S | 8/1967 | Battaglia | |
| 3,536,080 A | 10/1970 | Player | |
| 3,626,546 A | 12/1971 | Dove | |
| 3,844,036 A | 10/1974 | Wahl | |
| 3,893,424 A | 7/1975 | Casler | |
| 3,897,629 A | 8/1975 | Liedtke | |
| 3,953,926 A | 5/1976 | Kallikounis | |
| 3,955,238 A | 5/1976 | Remijas | |
| 3,981,275 A | 9/1976 | Schimoler | |
| 3,986,258 A | 10/1976 | Liedtke | |
| D244,712 S | 6/1977 | Houston | |
| 4,047,504 A | 9/1977 | Borba | |
| 4,083,327 A | 4/1978 | Dowdy | |
| 4,190,924 A | 3/1980 | Nicholson | |
| 4,198,751 A | 4/1980 | Egbert | |
| 4,357,043 A | 11/1982 | Towsend | |
| 4,479,311 A | 10/1984 | Blanco | |
| 4,532,707 A | 8/1985 | Allen | |
| 4,663,841 A | 5/1987 | Custer | |
| 4,683,657 A | 8/1987 | Anderson et al. | |
| 4,709,475 A | 12/1987 | Phung | |
| 4,833,956 A | 5/1989 | Roberts | |
| 4,928,716 A | 5/1990 | Greene | |
| 4,970,990 A | 11/1990 | Wilhelmi | |
| 5,022,350 A | 6/1991 | Sequist | |
| 5,095,853 A | 3/1992 | Kruger | |
| 5,176,105 A | 1/1993 | Madden | |
| 5,211,131 A | 5/1993 | Plyler | |
| 5,213,116 A | 5/1993 | Stein | |
| 5,365,881 A | 11/1994 | Sporn | |
| 5,449,007 A | 9/1995 | Arnhols | |
| 5,503,109 A | 4/1996 | Sporn | |
| D373,661 S | 9/1996 | Watson | |
| 5,690,057 A | 11/1997 | Curry | |
| 5,704,376 A | 1/1998 | Ogunro | |
| 5,768,748 A | 6/1998 | Silvera et al. | |
| 5,826,300 A | 10/1998 | Smith | |
| 5,862,780 A | 1/1999 | Landreneau | |
| 5,960,515 A | 10/1999 | Lu | |
| 6,055,938 A | 5/2000 | Klien | |
| 6,094,820 A | 8/2000 | Adachi | |
| 6,182,364 B1 | 2/2001 | Reyburn | |
| 6,513,249 B2 | 2/2003 | Linton et al. | |
| 6,955,137 B2 * | 10/2005 | Dunn et al. | 119/625 |

FOREIGN PATENT DOCUMENTS

| | | | |
|---|---|---|---|
| GB | 191515913 | | 7/1916 |
| GB | 49580 | | 6/1936 |
| WO | WO/1993/025069 | | 12/1993 |

OTHER PUBLICATIONS http://www.groomersmall.com/acc_knives.htm; The Groomer's Mall-Stripping Knives; "Accessories-Stripping Knives" Jan. 31, 2006; pp. 1-7.

Photographs produced to FURminator, Inc. during litigation; Defendant's Exhibits pp. 1-13; undated.

Photographs (2) of Mars' devices produced to FURminator, Inc., during litigation, undated.

Declaration of Paul C. Bryant: Feb. 6, 2006.

Deposition of Paul C. Bryant: Feb. 11, 2006.

Deposition of Joan Anderson: Feb. 11, 2006.

Deposition of Jodi Murphy: Feb. 10, 2006.

Deposition of Charles McLaughlin: Feb. 9, 2006.

Exhibit 1 to McLaughlin Deposition (2 pgs): *Terrier Type;* Nov. 1994; vol. 33, No. 11, p. 48.

Exhibit 2 to McLaughlin Deposition: Photograph, date unknown.

Exhibit 4 to McLaughlin Deposition: McLaughlin III, C.J., and Good, Margery: Macknyfe Specialties: *Use of Macknyfe Grooming Tools*, pp. 1-3; undated; Copyright 1992.

Exhibit 5 to McLaughlin Deposition: Pamphlet: McLaughlin III, C.J. and Good, Margery: *Use of Macknyfe Grooming Tools;* Macknyfe Specialties, Inc., 2 pgs., undated, Copyright 1992.

Exhibit 6 to McLaughlin Deposition: Photograph, date unknown.

Exhibit 8 to McLaughlin Deposition: (2 pgs): *Terrier Type;* Jun./Jul. 1995; vol. 34, Nos. 6-7, p. 111.

Exhibit 9 to McLaughlin Deposition: Catalogue: *How to Order Dilligad Strippers*: 3 pgs.

Exhibit 13 to McLaughlin Deposition: Catalogue: *Stripping Knives and Hair Splitters*; PetEdge, undated; website unknown.

Exhibit 14 to McLaughlin Deposition: Photograph, date unknown.

Exhibit 15 to McLaughlin Deposition: Photograph, date unknown.

Declaration of C. J. McLaughlin: unknown day, Feb. 2006.

Declaration of Jodi Murphy; Feb. 7, 2006.

Jodi Murphy (Curriculum Vitae).

DVD—"Captivating Cockers" Exhibit B to Declaration of Jodi Murphy.

Declaration of Joan M. Anderson; Feb. 7, 2006.

Joan M. Anderson (Curriculum Vitae).

DVD—"Grooming the American Cocker Spaniel" Exhibit B to Declaration of Joan Anderson.

*Ontel's and Linens 'N Things' Statements of Fact and Conclusions of Law*:: Filed Feb. 21, 2006.

Catalogue: *New England Serum Company*, Fall 1997, 2 pgs.

Photographs produced during litigation; unknown dates 6 pgs.

http://www.strippingknives.com/index.htm: Pearson Products; "Handcrafted Stripping Knives": Jan. 31, 2006; pp. 1-2 and Pearson Stripping Knives, Jan. 31, 2006, pp. 1-3.

http://www.ppthecompany.co.uk/c3257.html: Deshedding Tools, Jan. 12, 2006; 1 pg.

http://www.ppthecompany.co.uk/p556.html: Advanced Cosmic Deshedder; Jan. 12, 2006; 1 pg.

http://www.ppthecompany.co.uk/p573.html: Big Boy De Shedding Tool, Jan. 12, 2006, 2 pgs.

Compilation of printouts from multiple web sites; 67 pgs.

Redacted, Nonconfidential Version of Findings of Fact and Conclusions of Law Previously Issued Mar. 17, 2006, Apr. 19, 2006, pp. 1-43.

Redacted, Nonconfidential Version of *Ontel's Memorandum in Opposition To FURminator's Motion For Preliminary Injunction* filed Oct. 24, 2006 (19 pp.).

Exhibit B to *Ontel's Memorandum in Opposition To FURminator's Motion For Preliminary Injunction* filed Oct. 24, 2006 (3 pp.).

Nov. 1, 2006 Declaration of Kim Laube (5 pp.).

Exhibit 1 to the Nov. 1, 2006 Declaration of Kim Laube (1 pg.): Photograph: date unknown.

Exhibit 2 to the Nov. 1, 2006 Declaration of Kim Laube (1 pg.): Photograph: date unknown.

Exhibit 3 to the Nov. 1, 2006 Declaration of Kim Laube (1 pg.): Photograph: date unknown.

Exhibit 4 to the Nov. 1, 2006 Declaration of Kim Laube (1 pg.): Photograph: date unknown.
Exhibit 5 to the Nov. 1, 2006 Declaration of Kim Laube (1 pg.): Photograph: date unknown.
Exhibit 6 to the Nov. 1, 2006 Declaration of Kim Laube (1 pg.): Photograph: date unknown.
Exhibit 7 to the Nov. 1, 2006 Declaration of Kim Laube (1 pg.): Photograph: date unknown.
Exhibit 8 to the Nov. 1, 2006 Declaration of Kim Laube (1 pg.): Photograph: date unknown.
Exhibit 9 to the Nov. 1, 2006 Declaration of Kim Laube (1 pg.): Photograph: date unknown.
Exhibit 10 to the Nov. 1, 2006 Declaration of Kim Laube (1 pg.): Photograph: date unknown.
Exhibit 11 to the Nov. 1, 2006 Declaration of Kim Laube (1 pg.): Photograph: date unknown.
Exhibit 12 to the Nov. 1, 2006 Declaration of Kim Laube (1 pg.): Photograph: date unknown.
Exhibit 13 to the Nov. 1, 2006 Declaration of Kim Laube (1 pg.): Photograph: date unknown.
Exhibit 14 to the Nov. 1, 2006 Declaration of Kim Laube (1 pg.): Photograph: date unknown.
Exhibit 15 to the Nov. 1, 2006 Declaration of Kim Laube (1 pg.): Photograph: date unknown.
Exhibit 16 to the Nov. 1, 2006 Declaration of Kim Laube (1 pg.): Photograph: date unknown.
Exhibit 17 to the Nov. 1, 2006 Declaration of Kim Laube (1 pg.): Photograph: date unknown.
Exhibit 18 to the Nov. 1, 2006 Declaration of Kim Laube (1 pg.): Photograph: date unknown.
Exhibit 19 to the Nov. 1, 2006 Declaration of Kim Laube (1 pg.): Photograph: date unknown.
Exhibit 20 to the Nov. 1, 2006 Declaration of Kim Laube (1 pg.): Photograph: date unknown.
Exhibit 21 to the Nov. 1, 2006 Declaration of Kim Laube (1 pg.): Photograph: date unknown.
Oct. 19, 2006 Declaration of Joan Anderson (13pp.): (Note: as referenced in this document, Exhibit B is the cited reference hhtp://groomersmall.com/acc_knives.htm).
Exhibit D to the Oct. 19, 2006 Declaration of Joan Anderson (6 pp.): Lynne Carver: *Take it Off* : magazine artical: Sep./Oct. 1992 issue of Groom & Board: vol. 13, No. 8: H.H. Backer Associates Inc.: Chicago, IL., U.S.A.
Exhibit E to the Oct. 19, 2006 Declaration of Joan Anderson (1p.): Photograph: date unknown.
Exhibit F to the Oct. 19, 2006 Declaration of Joan Anderson (1p.): Photograph: date unknown.
Exhibit G to the Oct. 19, 2006 Declaration of Joan Anderson (1p.): Photograph: date unknown.
Exhibit H to the Oct. 19, 2006 Declaration of Joan Anderson (1p.): Photograph: date unknown.
Exhibit I to the Oct. 19, 2006 Declaration of Joan Anderson (1p.): Photograph: date unknown.
Exhibit J to the Oct. 19, 2006 Declaration of Joan Anderson (1p.): Photograph: date unknown.
Exhibit K to the Oct. 19, 2006 Declaration of Joan Anderson (1p.): Photograph: date unknown.
Exhibit L to the Oct. 19, 2006 Declaration of Joan Anderson (1p.): Photograph: date unknown.
Exhibit M to the Oct. 19, 2006 Declaration of Joan Anderson (4 pp.): Photograph: date unknown.
Exhibit N to the Oct. 19, 2006 Declaration of Joan Anderson (4 pp.): anonymous author: *Building The Coat*: Ch. 8 of booklet titled *Clipping and Grooming Your Terrier*: 1970: Arco Publishing Company, Inc.: New York, NY, U.S.A.
Exhibit O to the Oct. 19, 2006 Declaration of Joan Anderson (10 pp.): Photographs: dates unknown.
October 21, 2006 Declaration of theone Andrew (4 pp.): (Note: as referenced in this document, Exhibit A is the same as cited Exhibit D to the Oct. 19, 2006 Declaration of Joan Anderson and Exhibits B and C are the same as the cited Exhibits 14 and 15 to the Nov. 1, 2006 Declaration of Kim Laube, respectively).
Oct. 19, 2006 Declaration of John T. Goolkasian (16 pp.).

Exhibit A to the Oct. 19, 2006 Declaration of John T. Goolkasian (8 pp.): Curriculum Vitae of John T. Goolkasian: date unknown.
Oct. 21, 2006 Declaration of Michele Greaves (3 pgs.): (Note: as referenced in this document, Exhibit A is the same as the cited Exhibit D to the Oct. 19, 2006 Declaration of Joan Anderson and Exhibits B and C are the same as the cited Exhibits 14 and 15 to the Nov. 1, 2006 Declaration of Kim Laube, respectively).
Oct. 23, 2006 Declaration of Margaret "Peggy" Harris (2 pgs.).
Oct. 23, 2006 Declaration of Pam Lauritzen (11 pgs.).
Exhibit A to the Oct. 23, 2006 Declaration of Pam Lauritzen (12 pgs.): Brochures: dates unknown.
Exhibit C to the Oct. 23, 2006 Declaration of Pam Lauritzen (6 pgs.): Marjorie Rollins, Kathleen Putman, and Pam Lauritzen: *Sporting Breeds Workbook* : Jan. 1996: Pam Lauritzen & Co.
Exhibit D to the Oct. 23, 2006 Declaration of Pam Lauritzen (10 pgs.): Photographs: dates unknown.
Exhibit E to the Oct. 23, 2006 Declaration of Pam Lauritzen (5 pgs.): Photographs: dates unknown.
Exhibit F to the Oct. 23, 2006 Declaration of Pam Lauritzen (16 pgs.): Registration forms and class lists: dates and authors unknown.
Nov. 2, 2006 Deposition Transcript of Joan M. Anderson (249 pgs.): vols. 1 and 2: (Note: as referenced in this document, Exhibits 2, 3, 4, and 5 are the same as cited Exhibits 2, 6, 14, and 15 to McLaughlin Deposition, respectively, Exhibits 6-11 collectively are the same as cited "Photographs produced during litigation", Exhibit 17 is the cited "Winter 1997 Pet Stylist magazine article", Exhibit 12 is the cited http://www.groomersmall.com/acc_knives.htm, and Exhibits 15, 16, and 34 are the same as cited Exhibits D, N, and O to the Oct. 19, 2006 Declaration of Joan Anderson, respectively).
Nov. 2, 2006 Deposition Transcript of John T. Goolkasian (47 pgs.): (Note: Exhibit 1 referenced in this document is the cited Oct. 19, 2006 Declaration of John T. Goolkasian).
Nov. 3, 2006 Deposition Transcript of Pamela Sue Lauritzen (82 pgs.): (Note: as referenced in this document, Exhibit 1 is the cited Oct. 23, 2006 Declaration of Pam Lauritzen, Exhibits 9, 14, and 26 are the cited Exhibits E, D, and F to the Oct. 23, 2006 Declaration of Pam Lauritzen, respectively, Exhibits 18, 19, 20, 23, 24 and 25 are the same as the cited Exhibits 6, 14, 15, 4, 2 and 9 to McLaughlin Desposition, respectively, Exhibit 22 is the cited http://www.striupping knives.com/index.htm, and Exhibit 21 is the same as cited "Photographs produced during litigation").
Exhibit 2 to the Nov. 3, 2006 Deposition Transcript of Pamela Sue Lauritzen (4 pgs.): Copy of Judgement issued Dec. 23, 1996.
Exhibit 3 to the Nov. 3, 2006 Deposition Transcript of Pamela Sue Lauritzen (3 pgs.): Consulting Agreement.
Exhibit 16 to the Nov. 3, 2006 Deposition Transcript of Pamela Sue Lauritzen (13 pgs.): Comments and markups regarding draft of Oct. 23, 2006 Declaration of Pam Lauritzen.
Nov. 3, 2006 Deposition Transcript of Kim Laube (173 pgs.): (Note: as referenced in this document, Exhibit A is the cited Nov. 1, 2006 Declaration of Kim Laube, Exhibit B is cited Exhibits 1-21 to the Nov. 1, 2006 Declaration of Kim Laube.
Exhibit C to the Nov. 3, 2006 Deposition Transcript of Kim Laube (7 pgs.): Photographs, dates unknown.
Exhibit D to the Nov. 3, 2006 Deposition Transcript of Kim Laube (10 pgs.): Photographs, dates unknown.
Exhibit E to the Nov. 3, 2006 Deposition Transcript of Kim Laube (2 pgs.): Hand written note, date unknown.
Nov. 2, 2006 Deposition Transcript of theone Andrew (122 pgs.): (Note: as referenced in this document, Exhibit 1 is the cited Oct. 21, 2006 Declaration of theone Andrew, Exhibit 3 is the same as cited Exhibit D to the Oct. 19, 2006 Declaration of Joan Anderson, Exhibits 4 and 5 are the same as cited Exhibits 14 and 15 to the Nov. 1, 2006 Declaration of Kim Laube, respectively, Exhibits 12 is the same as the collection of cited Exhibits 2, 6, 14, and 15 to McLaughlin Deposition, Exhibit 13 is the same as cited "Photographs produced during litigation", and Exhibit 14 is the same as cited Exhibit 4 to McLaughlin Deposition).

Nov. 2, 2006 Deposition Transcript of Michele Lynn Greaves (113 pgs.): (Note: as referenced in this document, Exhibit 1 is the cited Oct. 21, 2006 Declaration of Michele Greaves, Exhibit 2 is the same as cited Exhibit D to the Oct. 19, 2006 Declaration of Joan Anderson, Exhibits B and C are the same as cited Exhibits 14 and 15 to the Nov. 1, 2006 Declaration of Kim Laube, respectively). Copy of http://www.groomersmall.com/acc_knives.htm is high resolution color.

\* cited by examiner

PET GROOMING TOOL AND METHOD FOR REMOVING LOOSE HAIR FROM A FURRY PET

CROSS-REFERENCE TO RELATED APPLICATIONS

This is a continuation of U.S. patent application Ser. No. 10/892,781 filed Jul. 16, 2004 entitled Pet Grooming Tool (incorporated herein by reference), which is a continuation of U.S. patent application Ser. No. 09/584,053 filed May 30, 2000 (now U.S. Pat. No. 6,782,846) entitled Pet Grooming Tool and Method for Removing Loose Hair from a Furry Pet (incorporated herein by reference).

STATEMENT REGARDING FEDERALLY SPONSORED RESEARCH OR DEVELOPMENT

Not Applicable.

APPENDIX

Not Applicable.

BACKGROUND OF THE INVENTION

This invention relates to pet grooming tools and methods for removing loose hair from a furry pet such as a dog or cat, such as loose hair from the pet's undercoat.

Many pets, such as dogs and cats, tend to molt or shed hair. Pet owners generally want to remove the shed hair from their pets to minimize the amount of hair the pets shed indoors and to improve their pets' appearance. The most common grooming tools used for removing shed hair include brushes and combs. Removing shed hair from a pet by brushing and/or combing a pet's fur is a tedious and time consuming project, because the brush or comb tends to miss most of the shed hair.

Some pet groomers have determined that a toothed blade removed from electric grooming sheers is effective for removing shed hair from a dog or cat. The toothed blade includes a relatively sharp blade edge with a plurality of relatively short, comb-like teeth extending from the edge. Although effective in removing shed hair, the size and shape of the toothed blade makes it difficult to hold while combing or passing the blade over the pet's fur. This difficulty fatigues a groomer's hands and arms, thereby limiting the time a groomer can groom pets in this manner.

SUMMARY OF THE INVENTION

Among the several objects and features of the present invention may be noted: the provision of an improved pet grooming tool for removing shed hair from a pet; the provision of an improved method for removing shed hair from a pet; the provision of such a tool and method which removes shed hair quickly and effectively; the provision of such grooming tool and method which minimizes fatigue to a pet groomer using the tool or method to remove shed hair method from a pet.

Generally, a pet grooming tool of the present invention is for use with a furry pet such as a dog or cat having loose hair and non-loose hair. The pet grooming tool is adapted for removing the loose hair from the pet. The grooming tool comprises an elongate handle portion extending generally along a handle axis, and a pet engageable portion secured to the handle portion. The pet engageable portion includes a blade portion and a plurality of teeth. The blade portion includes a blade edge. The teeth extend from the blade edge. The pet engageable portion is secured to the handle portion in a manner so that pulling the handle portion generally along the handle axis while the pet engageable portion is in engagement with the pet causes the blade portion to engage the loose hair of the pet and pull it from the pet without cutting or pulling the non-loose hair from the pet.

Another aspect of the present invention is a method of removing loose hair from a furry pet such as a dog or cat having loose hair and non-loose hair. The method comprises providing a grooming tool having an elongate handle portion extending generally along a handle axis, and a pet engageable portion secured to the handle portion. The pet engageable portion includes a blade portion and a plurality of teeth. The blade portion includes a blade edge. The teeth extend from the blade edge. The method further comprises placing the pet engageable portion in engagement with the pet, and pulling the handle portion generally along the handle axis while maintaining engagement of the pet engageable portion with the pet to cause the blade portion to engage the loose hair of the pet and pull it from the pet without cutting or pulling the non-loose hair from the pet.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
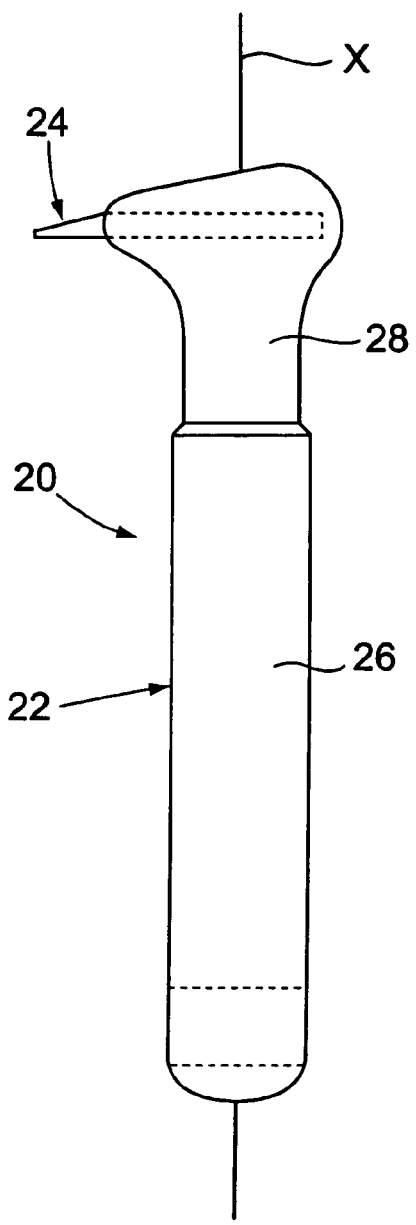
FIG. 1 is a side elevational view of a grooming tool of the present invention, the grooming tool having a handle portion and a pet engageable portion.
Figure 2:
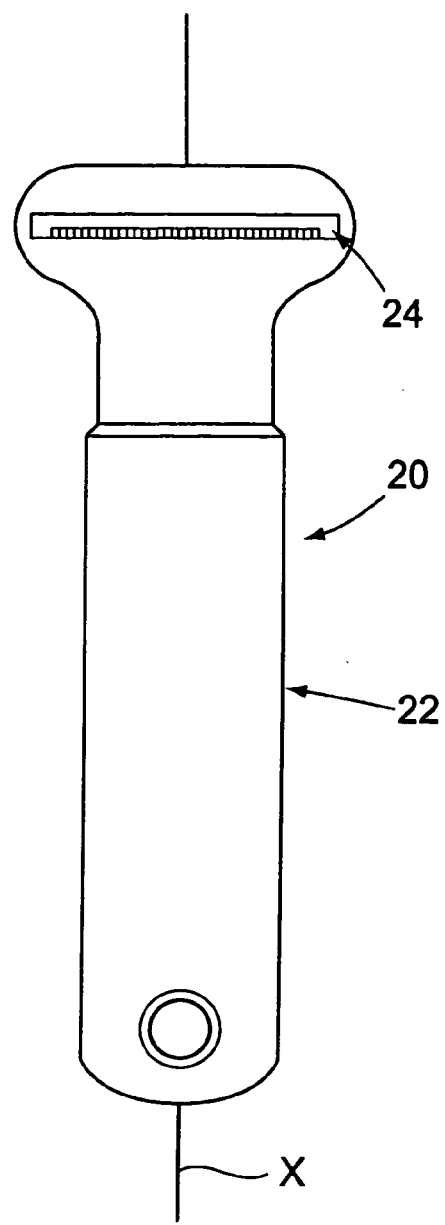
FIG. 2 is a front-elevational view of the grooming tool of FIG. 1.
Figure 3:
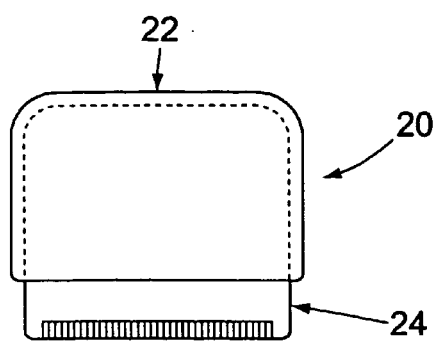
FIG. 3 is a top plan view of the grooming tool of FIG. 1.

Referring first to FIGS. 1–3 of the drawings, a pet grooming tool of the present invention is generally indicated by reference numeral 20. The pet grooming tool 20 is adapted to be used with a furry pet (not shown) such as a dog or cat having loose hair and non-loose hair for removing the loose hair from the pet. The grooming tool comprises an elongate handle portion, generally indicated at 22, and a pet engageable portion, generally indicated at 24. The elongate handle portion 22 extends generally along a handle axis X. The handle portion 22 includes a hand-grip portion 26 and a head portion 28. The hand-grip portion 26 is preferably sized and shaped to be comfortably held in the palm of a user's hand. Preferably, the hand-grip portion is at least three inches in length. The head portion 28 preferably extends axially from the hand-grip portion 26 and is adapted for securely holding the pet-engageable portion.

Figure 4:
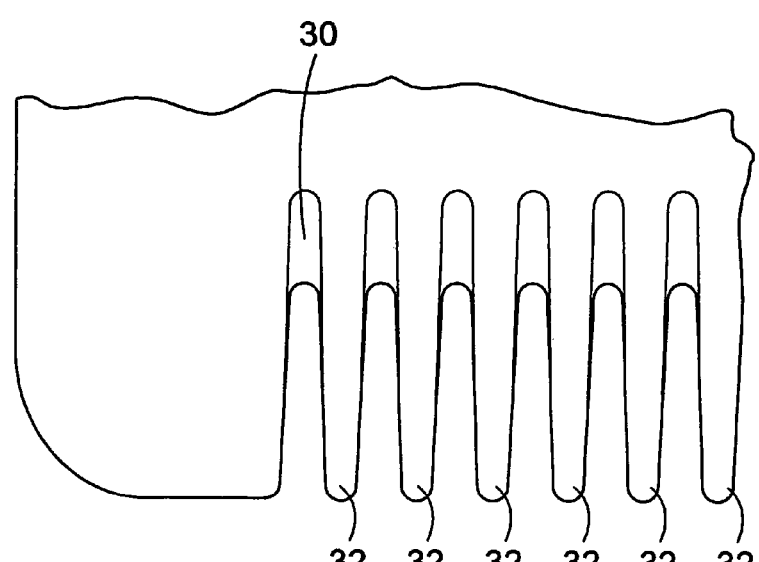
FIG. 4 is an enlarged, fragmented, top plan view showing a plurality of teeth and a blade portion of the pet-engageable portion of the grooming tool of FIG. 1.
Figure 5:
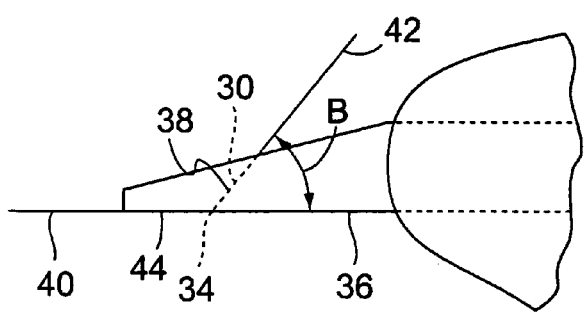
FIG. 5 is an enlarged, fragmented side-elevational view of the pet-engageable portion of the grooming tool of FIG. 1, the blade portion being shown by hidden lines.

The pet engageable portion 24 may consist of a one-piece blade for an electric animal hair clipper, such as an Oster® A5® blade (size 40 or 50, but preferably size 40) commercially available from Sunbeam Corporation. The pet engageable portion 24 includes a blade portion 30 (FIGS. 4 and 5) and a plurality of teeth 32. The blade portion includes a blade edge 34. The teeth 32 extend from the blade edge 34.

The pet engageable portion 24 is oriented relative to the handle portion 22 in a manner so that pulling the handle portion generally along the handle axis X while the pet engageable portion is in engagement with the pet causes the blade portion 30 to engage the loose hair of the pet and pull it from the pet without cutting or pulling the non-loose hair from the pet.

Preferably, the blade portion 30 has a first generally planar surface 36 and a second generally planar surface 38. Preferably, the first planar surface 36 is generally perpendicular to the handle axis X and lies in a first plane 40. The second planar surface 38 lies in a second plane 42. The first and second planar surfaces 36, 38 meet to form a sharp angle (i.e., a sharp apex). The junction (angle or apex) of the two planar surfaces 36, 38 constitutes the blade edge 34. Preferably, the first and second planes 40, 42 form an angle B between approximately 30° and 50° and more preferably approximately 40°. Preferably, the blade portion 30 is oriented relative to the handle portion 22 so that the blade portion trails the handle portion as the handle portion is pulled generally along the handle axis while the pet engageable portion 24 is in engagement with the pet. In particular, the first planar surface 36 constitutes a leading surface and the second surface 38 constitutes a trailing surface. The blade portion 30 is oriented relative to the handle portion 22 in a manner so that the trailing surface 38 trails the leading surface 36 as the handle portion is pulled generally along the handle axis while the pet engageable portion 24 is in engagement with the pet. Preferably, the blade portion 30 is spaced laterally from the hand grip portion 26 of the handle portion 22. Preferably, the teeth 32 are in a side-by-side comb-like orientation and have forward surfaces 44 which extend generally along the first planar surface 40. Preferably, the tip to tip spacing between adjacent teeth 32 is between approximately 0.02" and 0.03", and more preferably approximately 0.025". Also preferably, the teeth 32 have a length of approximately 0.08" and 0.14", and more preferably approximately 0.11" in length.

The pet engageable portion 24 is fixed to the handle portion 22 in a manner so that the pet engageable portion is generally stationary relative to the handle portion when the pet grooming tool 20 is used to remove loose hair from the pet. Preferably, the pet grooming tool 20 consists essentially of only the handle portion 22 and the pet engageable portion 24. In other words, the pet grooming tool 20 is devoid of any motor mechanism and is devoid of any components adapted to be driven by an electrical power source. This is stated herein to distinguish the pet grooming tool 20 from clippers or shavers. The pet grooming tool 20 is not configured to cut hair from the pet, but rather to pull the loose hair from the pet. Thus, the only essential components of the pet grooming tool 20 are the handle portion 22 and the pet engageable portion 24.

To remove loose hair from a pet, a user places the pet engageable portion 24 of the pet grooming tool 20 in engagement with the pet. More particularly, the user places the teeth 32 of the pet grooming tool 20 against the pet's coat in a manner so that the first planar surface 36 is generally perpendicular to the region of the pet's coat engaged by the teeth 32. The user then pulls the handle portion 22 generally along the handle axis X while maintaining engagement of the teeth 32 with the pet's coat. Preferably, the user also maintains the generally perpendicular orientation of the first planar surface 36 relative to the pet's coat. The pet grooming tool 20 is pulled in a manner so that the second planar surface 38 trails the first planar surface 36. Pulling the pet grooming tool 20 in this manner causes the blade portion 30 to engage the loose hair of the pet and pull it from the pet without cutting or pulling the non-loose hair from the pet.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of removing loose hair from a furry pet such as a dog or cat having loose hair and non-loose hair, the method comprising:

providing a grooming tool having a handle portion extending generally along a handle axis, and a pet engageable portion secured to the handle portion, the pet engageable portion including a blade portion and a plurality of teeth, the blade portion comprising a leading surface and a trailing surface defining a blade edge, the teeth extending from the blade edge;

placing the pet engageable portion in engagement with the pet;

holding the handle portion and moving the pet engageable portion in a first direction while maintaining engagement of the pet engageable portion with the pet to cause the blade edge to engage the loose hair of the pet and pull it from the pet without cutting or pulling the non-loose hair from the pet, the first direction comprising a direction in which the trailing surface trails the leading surface.

2. A method as set forth in claim 1 wherein the step of holding the handle portion and moving the pet engageable portion in the first direction while maintaining engagement of the pet engageable portion with the pet is performed without moving any components of the tool with an electrical power source.

3. A method as set forth in claim 1 wherein the leading surface comprises a generally planar surface, and wherein the leading surface is maintained in a generally perpendicular orientation relative to the pet during the step of moving the pet engageable portion in the first direction while maintaining engagement of the pet engageable portion with the pet.

4. A method as set forth in claim 1 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

5. A pet grooming tool as set forth in claim 4 wherein the teeth extend away from the blade edge segments in a direction generally perpendicular to the first direction during the step of moving the pet engageable portion in the first direction while maintaining engagement of the pet engageable portion with the pet.

6. A method as set forth in claim 1 wherein the plurality of teeth are arranged in a row comprising a plurality of pairs of adjacent teeth, the teeth of each of at least some of the pairs of adjacent teeth being spaced from one another.

7. A method as set forth in claim 1 wherein the pet engageable portion is fixed to the handle portion in a manner so that the pet engageable portion is generally stationary relative to the handle portion during the step of moving the pet engageable portion in the first direction while maintaining engagement of the pet engageable portion with the pet.

8. For use with a furry pet such as a dog or cat having loose hair and non-loose hair, a pet grooming tool for removing the loose hair from the pet, the grooming tool comprising:
an elongate handle portion extending generally along a handle axis;
a pet engageable portion secured to the handle portion, the pet engageable portion including a blade portion and a plurality of teeth, the blade portion comprising a leading surface and a trailing surface defining a blade edge, the teeth extending from the blade edge;
the blade edge being adapted to engage the loose hair of the pet and pull it from the pet without cutting or pulling the non-loose hair from the pet as the pet engageable portion is moved in a first direction while the pet engageable portion is in engagement with the pet, the first direction being a direction in which the trailing surface trails the leading surface.

9. A pet grooming tool as set forth in claim 8 wherein the leading surface comprises a first planar surface and the trailing surface comprises a second planar surface, the first and second planar surfaces forming an angle between approximately 30° and 40°, the angle constituting the blade edge.

10. A pet grooming tool as set forth in claim 9 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

11. A pet grooming tool as set forth in claim 8 wherein the pet engageable portion is fixed to the handle portion in a manner so that the pet engageable portion is generally stationary relative to the handle portion when the pet grooming tool is used to remove loose hair from the pet.

12. A pet grooming tool as set forth in claim 11 wherein the tool is devoid of any motor mechanism.

13. A pet grooming tool as set forth in claim 8 wherein the tool is devoid of any components adapted to be driven by an electrical power source.

14. A pet grooming tool as set forth in claim 8 wherein each tooth extends from the blade edge a length between approximately 0.08" and 0.14".

15. A pet grooming tool as set forth in claim 8 wherein the distance from the tip of one of the teeth to the tip of another of the teeth adjacent said one of the teeth is between approximately 0.02" to approximately 0.03".

16. A pet grooming tool as set forth in claim 8 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

17. A pet grooming tool as set forth in claim 8 wherein the plurality of teeth are arranged in a row comprising a plurality of pairs of adjacent teeth, the teeth of each of at least some of the pairs of adjacent teeth being spaced from one another.

18. A pet grooming tool as set forth in claim 8 wherein the leading surface comprises a first planar surface and each of at least some of the plurality of teeth has a forward surface coplanar with the first planar surface and extending from the blade edge.

19. For use with a furry pet such as a dog or cat having loose hair and non-loose hair, a pet grooming tool for removing the loose hair from the pet, the grooming tool comprising:
a handle portion extending generally along a handle axis;
a pet engageable portion secured to the handle portion, the pet engageable portion including a blade portion and a plurality of teeth, the blade portion comprising a leading surface and a trailing surface defining a blade edge, the teeth extending from the blade edge;
the blade edge being adapted to engage the loose hair of the pet and pull it from the pet without cutting or pulling the non-loose hair from the pet as the pet engageable portion is moved in a first direction while the pet engageable portion is in engagement with the pet, the first direction being a direction in which the trailing surface trails the leading surface.

20. A pet grooming tool as set forth in claim 19 wherein the leading surface comprises a first planar surface and the trailing surface comprises a second planar surface, the first and second planar surfaces forming an angle between approximately 30° and 40° the angle constituting the blade edge.

21. A pet grooming tool as set forth in claim 20 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

22. A pet grooming tool as set forth in claim 19 wherein the pet engageable portion is fixed to the handle portion in a manner so that the pet engageable portion is generally stationary relative to the handle portion when the pet grooming tool is used to remove loose hair from the pet.

23. A pet grooming tool as set forth in claim 22 wherein the tool is devoid of any motor mechanism.

24. A pet grooming tool as set forth in claim 19 wherein the tool is devoid of any components adapted to be driven by an electrical power source.

25. A pet grooming tool as set forth in claim 19 wherein each tooth extends from the blade edge a length between approximately 0.08" and 0.14".

26. A pet grooming tool as set forth in claim 19 wherein the distance from the tip of one of the teeth to the tip of another of the teeth adjacent said one of the teeth is between approximately 0.02" to approximately 0.03".

27. A pet grooming tool as set forth in claim 19 wherein the blade edge includes a plurality of blade edge segments, the plurality of teeth being arranged in a row comprising a plurality of pairs of adjacent teeth, the teeth of each of at least some of the pairs of adjacent teeth being spaced from one another, each of at least some of the blade edge segments being between the teeth of a corresponding one of the pairs of adjacent teeth.

28. A pet grooming tool as set forth in claim 19 wherein the plurality of teeth are arranged in a row comprising a plurality of pairs of adjacent teeth, the teeth of each of at least some of the pairs of adjacent teeth being spaced from one another.

29. A pet grooming tool as set forth in claim 19 wherein the leading surface comprises a first planar surface and each of at least some of the plurality of teeth has a forward surface coplanar with the first planar surface and extending from the blade edge.

* * * * *